United States Patent [19]

Dublinski et al.

[11] Patent Number: 5,286,438
[45] Date of Patent: Feb. 15, 1994

[54] METHOD OF FABRICATING A COMPLEX PART MADE OF COMPOSITE MATERIAL

[75] Inventors: Alexander C. Dublinski, Northford; Ronald J. Cooper, Milford; Edward J. Fabian, Derby; Gary J. Jacaruso; Philip J. Ramey, both of Milford; Darryl M. Toni, North Haven, all of Conn.; Matthew T. Turner, Acton, Mass.

[73] Assignee: United Technologies Corporation, Hartford, Conn.

[21] Appl. No.: 899,571

[22] Filed: Jun. 12, 1992

Related U.S. Application Data

[63] Continuation of Ser. No. 629,934, Dec. 19, 1990, abandoned.

[51] Int. Cl.[5] .................. B29C 33/40; B29C 43/10
[52] U.S. Cl. .................... 264/220; 264/225; 264/227; 264/257; 264/258; 264/313
[58] Field of Search ............... 264/257, 258, 510, 313, 264/314, 219, 220, 225, 227, 511, 571; 425/346; 249/119, 117, 122, 142

[56] References Cited

U.S. PATENT DOCUMENTS

| | | | |
|---|---|---|---|
| 3,146,148 | 8/1964 | Mitchella et al. | 264/571 |
| 3,369,949 | 2/1968 | Forrest | 156/232 |
| 4,126,719 | 11/1978 | Koyanagi et al. | 264/257 |
| 4,311,661 | 1/1982 | Palmer | 264/257 |
| 4,557,779 | 12/1985 | Bower et al. | 156/219 |
| 4,657,615 | 4/1987 | Braun et al. | 156/245 |
| 4,693,678 | 9/1987 | Von Volki | 264/510 |
| 4,702,390 | 10/1987 | Rinkovsky, Sr. | 264/257 |
| 4,738,813 | 4/1988 | Finkensiep | 264/313 |
| 4,766,025 | 8/1988 | Sanok et al. | 249/142 |
| 4,822,436 | 4/1989 | Callis et al. | 264/571 |
| 4,824,631 | 4/1989 | Yeager | 264/313 |
| 4,834,929 | 5/1989 | Dehoff et al. | 264/257 |
| 4,853,172 | 8/1989 | Jacaruso et al. | 264/571 |
| 4,904,436 | 2/1990 | Rachal | 264/313 |
| 4,915,896 | 4/1990 | Rachal | 264/257 |
| 4,997,615 | 3/1991 | Cattanach et al. | 264/510 |
| 5,023,042 | 6/1991 | Efferding | 264/313 |
| 5,059,377 | 10/1991 | Ashton et al. | 264/258 |
| 5,152,949 | 10/1992 | Leoni et al. | 264/257 |

FOREIGN PATENT DOCUMENTS

| | | |
|---|---|---|
| 0319449 | 6/1989 | European Pat. Off. . |
| 3418110 | 11/1985 | Fed. Rep. of Germany . |
| 2231491 | 12/1974 | France . |
| 60-139433 | 11/1985 | Japan . |
| 8404905 | 12/1984 | PCT Int'l Appl. . |

Primary Examiner—Jay H. Woo
Assistant Examiner—Duane S. Smith

[57] ABSTRACT

The method of fabricating a complex part made of composite material and having a plurality of panels oriented in diverse angular relationship, and utilizing a plurality of conformable cauls upon which the composite material is individually laid up and which cauls cooperate to form one of the molds used in the co-curing of the individually laid-up composite materials.

17 Claims, 4 Drawing Sheets

METHOD OF FABRICATING A COMPLEX PART MADE OF COMPOSITE MATERIAL

This application is a continuation of application Ser. No. 07/629,934 filed on Dec. 19, 1990 now abandoned.

TECHNICAL FIELD

This invention relates to the molding of complex parts made of composite material, and utilizing a plurality of conformable cauls which cooperate to form one of the molds involved in the fabrication process and upon which the composite material is individually laid up and co-cured during the molding process.

BACKGROUND OF THE INVENTION

In the early molding prior art, simple parts could be molded by laying up the prepreg composite material selectively in a female mold, and then positioning the male mold within the female mold to apply pressure to the laid-up composite material, then placing the mold so assembled in an autoclave and curing the composite material under both heat and pressure. This early method produced a single, simple composite part whose outer periphery is defined by the contours of the female mold, and whose inner periphery is defined by the contours of the male mold. The composite material could as well have been laid up on the male mold in this early prior art process.

Eventually, a vacuum bag replaced one of the molds, usually the male mold, and when under vacuum, produced pressure on the prepreg laid-up composite material in the female mold to cause it to closely conform to the shape of the female mold, and, i.e., to debulk the composite material, during the curing process in the autoclave where heat and more pressure are used.

In the prior art, methods have been taught to produce a mold, which is a faithful reproduction of a complex surface. Typical of this prior art are U.S. Pat. No. 3,369,949 of N. Forrest and U.S. Pat. No. 4,557,779 of Bower et al.

In U.S. Pat. No. 3,369,949 to N. Forrest, issued Feb. 20, 1968, it was desired to produce a mold which would simulate a complex surface, such as corduroy cloth. This was done by laying the corduroy cloth on a flat horizontal surface, applying a separator to it, and then coating the cloth and separator with an elastomeric material, such as silicone rubber. Forrest then places a strengthening fabric over the first silicone layer, and a second silicone layer is laid up over the strengthening fabric. The entire assembly is cured to provide a negative mold to simulate the corduroy cloth. If the teaching of Forrest were applied to the problem which our invention addresses, it would be necessary to fabricate the individual panels of our complex part individually and then attach them together mechanically thereafter.

U.S. Pat. No. 4,577,779 to Bower et al, issued Dec. 10, 1985, similarly teaches producing a mold to be able to reproduce a textured surface. In Bower et al, the textured surface to be simulated is sealed, a release agent is applied over the sealed surface, and epoxy prepreg sheets are laid up thereon and cured such that, when removed following curing, a mold has been formed capable of reproducing the textured surface. Bower et al, like Forrest, does not attack the problem of producing a complicated product made of composite material and consisting of a series of panels oriented in diverse angular relationship. Forrest or Bower et al teach producing a single panel. To obtain the type of article which is produced following the teachings of our invention, several of these panels would have to be mechanically connected which would result in a very labor intensive, expensive and heavy construction.

As composite parts became more complicated, it was necessary to include additional parts such as strengtheners, called details, to the basic composite part. These details were preformed, but not precured, and then hand positioned against the laid-up prepreg layers as these layers are supported in a female mold. These details were difficult to hand position and experience showed that the application of vacuum by the vacuum bag caused the details to drift out of proper position.

To overcome this problem, an expandable male mold was devised, which had selected contours in it to receive the preformed, but not precured, details and bring them into proper position and contact with the laid-up prepreg layers of the female mold such that, following debulking and co-curing of the part and its details, a composite part with the details forming part thereof was produced. This is the subject matter of pending application Ser. No. 128,134 by Dublinski et al filed Sep. 8, 1987, abandoned in favor of continuing application U.S. Ser. No. 576,176 filed Aug. 30, 1990 which has issued as U.S. Pat. No. 5,071,338.

As parts which are to be made of composite material, became more complicated by the addition of transverse bulkheads, intermediate decks, "T" attaching blades and return flanges, it was not possible to produce them by these prior art processes, unless the various components were to be made individually and then mechanically fastened together, which would have resulted in a time consuming, expensive and heavy final product.

DISCLOSURE OF THE INVENTION

It is, therefore, an object of this invention to teach a molding process which is capable of producing a part made of composite material, and having a plurality of panels oriented in diverse angular relationship and wherein one of the molds used in the molding process comprises a plurality of conformable cauls which cooperate to form one of the molds during the molding process.

It is a further object of our invention to teach a molding process which produces a one-piece part made of composite material and having a plurality of panels oriented in diverse angular relationship, and which process is performed in reduced time and at reduced expense.

It is a further object to teach such a molding process in which the prepreg layers or preplies of composite material are laid up individually on each conformable caul, for ease and speed of handling, including automation, and wherein the individual lay ups of composite material are co-cured when the conformable cauls coact to form one of the molds during the molding process.

It is still a further object of this invention to teach such a molding process in which the laid-up composite material, ready for molding, can be placed in a cold environment to prevent commencing of the curing thereof and so that the curing of all lay-ups of composite material can occur at the desired time.

It is a further object of this invention to teach such a molding process in which the man hours required to perform the lay-up process is substantially reduced. This results in cost reduction. It is still a further object of this invention to teach such a molding process in which either the male or the female mold is rigid and the mating mold consists of a plurality of conformable cauls which cooperate to provide the other mold, or as a substitute for the prior art vacuum bag.

It is still a further object of this invention to teach such a molding process in which, with the prepreg composite material laid up and positioned between the mold members, the entire assembly is positioned within a one-piece silicone bag for debulking and curing.

It is a further object of this invention to teach such a molding process which provides cycle-to-cycle faithful repeatability.

It is still a further object of this invention to teach such a molding process in which the prepreg composite material can be laid up partially on each of the mold parts, or on either the rigid or the flexible mold part.

It is still a further object of this invention to teach such a molding process in which one of the mold parts comprises a plurality of conformable cauls, which have been fabricated utilizing a model formed to their shape, and which conformable cauls are fabricated to produce overlapping planes so that the cauls can follow the contour of the molds at mold corners when pressurized during the curing process.

It is still a further object of this invention to teach such a molding process in which the conformable cauls are fabricated of fluoroelastomer material, in which the conformable cauls are fabricated utilizing a model of the part to be produced, and in which separator release film is used between the model and the conformable caul material and between conformable cauls during their fabrication process.

It is still a further object of this invention to teach such a molding process in which the conformable cauls serve as a lay-up tool, serve as a prepreg ply compaction tool, serve as an accurate locater of the inner mold line or outer mold line details, and serve as a method for applying uniform pressure to the entire part being fabricated during the molding process.

It is still a further object of this invention to teach such a molding process in which utilization of conformable cauls permits a quick turnaround time of the molding process equipment so as to increase its production rate.

It is still a further object of this invention to teach such a molding process which permits the co-curing of several complex details, and is capable of accurately locating details, which are secondary bonding substrates, to be co-cured with the basic composite material during the molding process.

It is still a further object of this invention to teach such a molding process which lends itself to automated lay-up of the prepreg composite material layers.

Other objects, features and advantages of the invention will become apparent in light of the following description thereof.

BRIEF DESCRIPTION OF THE DRAWINGS

FIG. 6 is a brief diagrammatical illustration of the female mold, including cauls, within a vacuum bag preparatory to being put in an autoclave.

BEST MODE FOR CARRYING OUT THE INVENTION

To facilitate conveying the teachings of this invention, the fabrication of a simplified part will be described, although this process has been utilized to fabricate considerably more complex parts. Further, the process will be described utilizing a rigid female mold, although it should be realized that the male mold could as well be the rigid mold.

Further, as used herein, the term "co-curing" means the simultaneous curing of a composite part and its details, or the simultaneous curing of two or more composite parts, with or without details.

Figure 1:
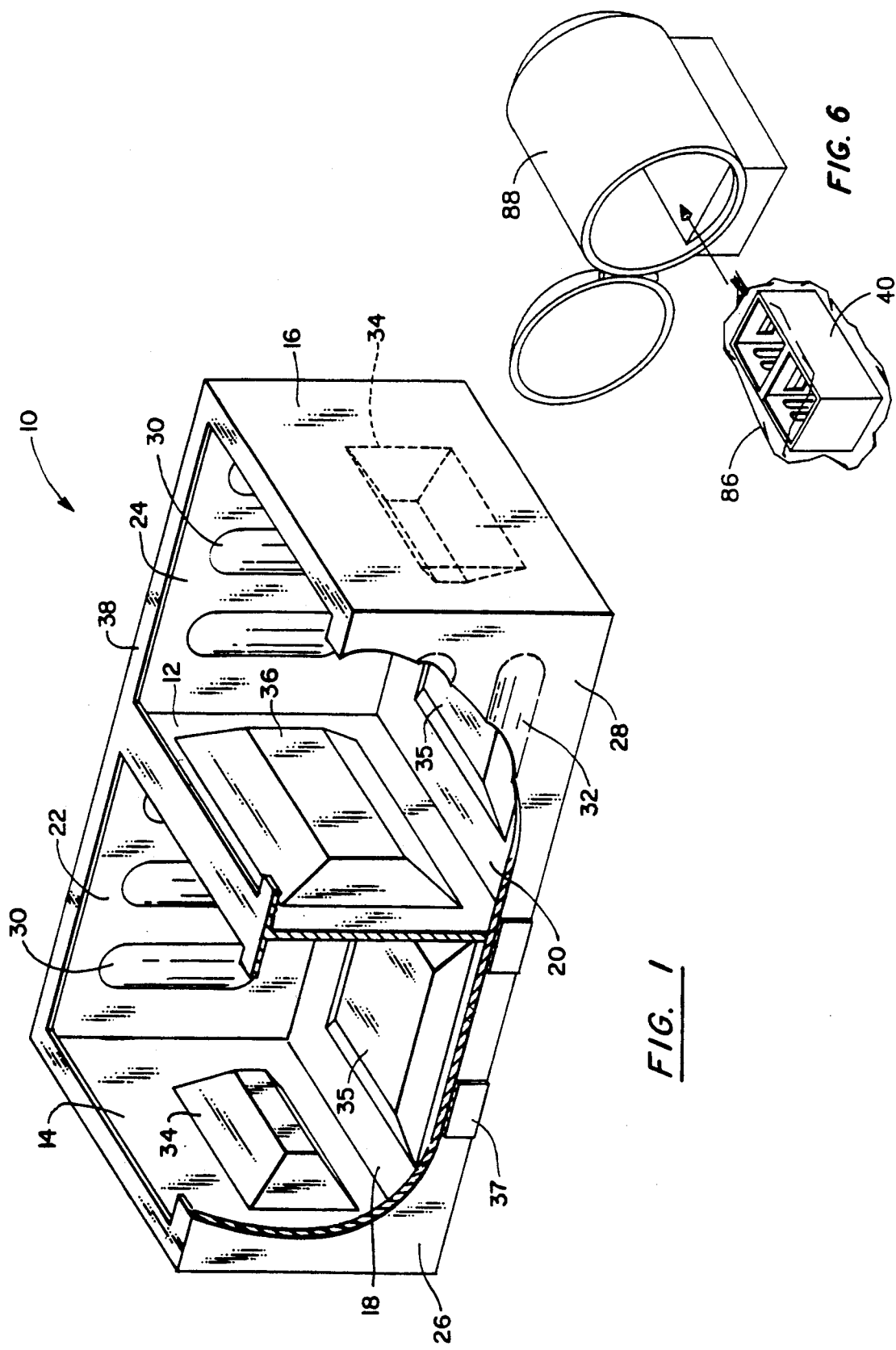
FIG. 1 is a prospective showing of a composite part of the type which can be fabricated utilizing our invention.

Viewing FIG. 1, we see the one-piece composite part to be made, which can be used as a torque box and storage structure in a helicopter fuselage made largely of composite parts to save weight and fabrication time and expense compared to such a part made of metal. The composite part to be fabricated 10 is a rectangular structure with a central partition or transverse bulkhead 12 and consisting of end panels 14 and 16, base panels 18 and 20, side members 22, 24, 26 and 28, each of which is made of composite material and fabricated so that in the bonding process, the individual panels are laid up and eventually co-cured to form a one-piece composite part shown as item 10 in FIG. 1. It will be noted that the side panels include strengthening beads, such as 30 and 32, the end panels 14 and 16, the floor panels 18 and 20, and the transverse bulkhead 12 include NOMEX ® (trademark of E. I. du Pont) core strengthening members 34, 35 and 36. These strengthening beads and cores, as well as thermoplastic bonding substrate 37, are all for the purpose of strengthening the final product 10. Part 10 also includes retainer flange 38, which will eventually be used to connect composite part 10 to the parts with which it will eventually be used.

Figure 2:
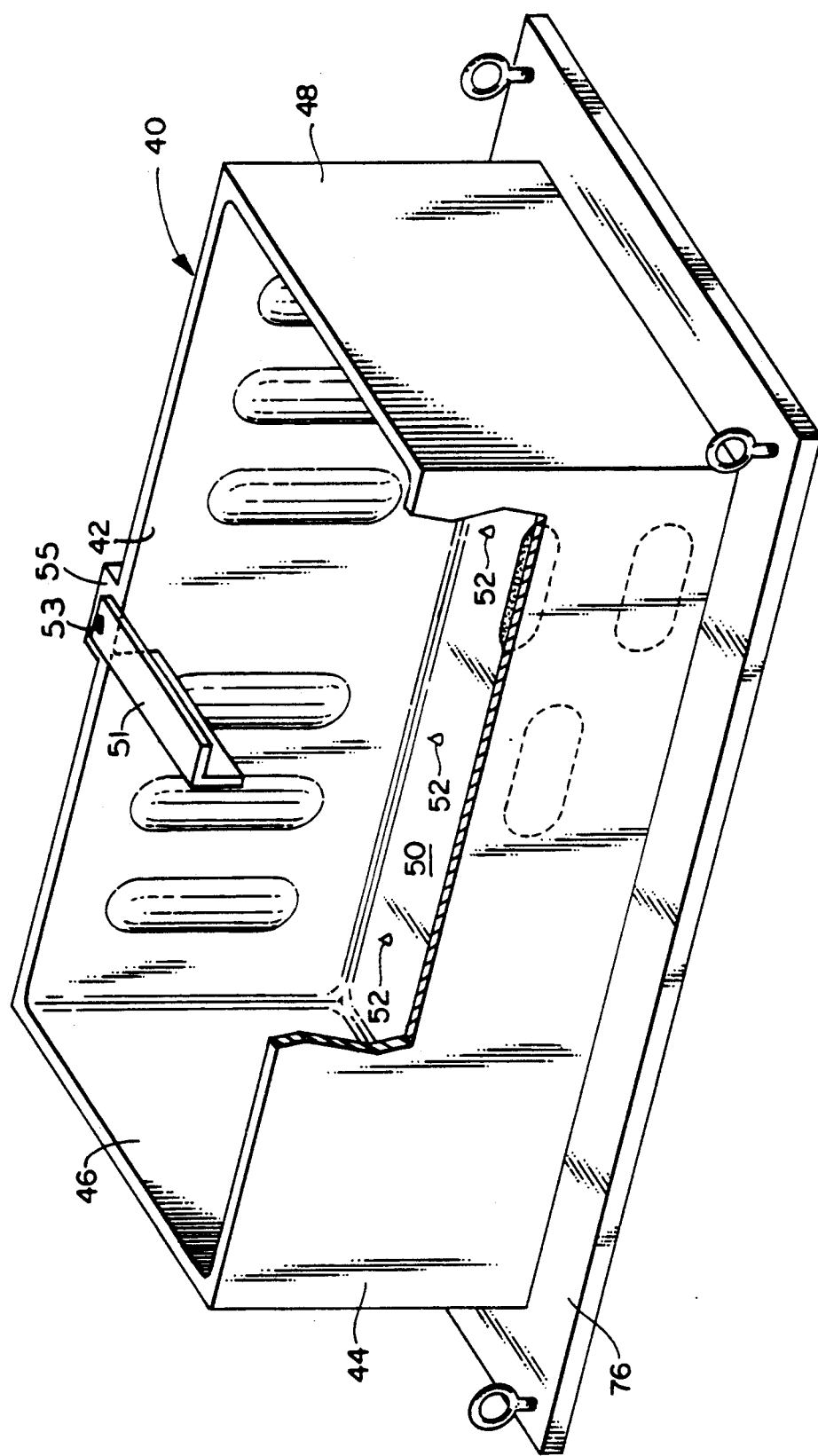
FIG. 2 is a showing of the female mold used in the molding process taught herein.

As shown in FIG. 2, our molding process utilizes a rigid female mold 40, which is preferably made of steel for durability, and which is dimensioned to define the outer mold line (OML) of part 10, wherein side wall 42 forms the outer mold line for part panels 22 and 24, side wall 44 forms the outer mold line for part panels 26 and 28, and end walls 46 and 48 form the outer mold line for the end panels 14 and 16 of member 10. Mold bottom wall 50 forms the outer mold line for bottom or floor panels 18 and 20 and includes a plurality of locator cones 52 which serve to loosely position the conformable cauls during the molding process as described hereinafter.

Conformable cauls will be utilized to perform the function of the flexible male mold in our molding process, and their fabrication will now be described.

To fabricate the conformable cauls, an exact model of part 10 is made either of fiberglass, wood, or other available material that is capable of withstanding the desired heat and pressure necessary to vulcanize fluoroelastomer materials. That model is positioned in female mold 40, sometimes called the tool, for purposes of rigidity during the conformable caul fabrication process. A conformable caul is to be formed for each of the composite part panels 12 through 20, or conceivably for portions of each. These conformable cauls, when fabricated, will cooperate to define the inner mold line (IML) of part 10. In the fabrication of these individual conformable cauls, a layer of separator release film is first placed on the surface of each of the aforementioned model panels, and the conformable cauls will be laid up individually, i.e., one at a time, on each of panels 12 through 20. A layer of separator release film is positioned between each lay-up so that following lay-up curing, individual and discrete conformable cauls will have been formed for each of the panels 12 through 20. In fact, a conformable caul will be fabricated for each side of panel or transverse bulkhead 12 since the opposite side of bulkhead 12, which is not shown in FIG. 1, is the mirror image of the side shown in FIG. 1. The conformable cauls are made of fluoroelastomer and are preferably five ply. The first ply is preferably a 0.032 inch ply of release coated fluoroelastomer. The second ply is preferably a 0.030 inch ply of fluoroelastomer gum stock. The third and fourth plies are a 0.040 inch ply of KEVLAR ® reinforced fluoroelastomer, while the fifth ply is the same as the second ply, thereby giving a ply lay-up of 0.172 inches of reinforced fluoroelastomer for each of the conformable cauls. The material for each of these plies can be obtained, for example, from the Minnesota, Mining & Manufacturing Company of Minneapolis, Minn.

A layer of separator release film is positioned between the lay-up on each panel member 12 through 20 so that, following curing, discrete and individual conformable cauls will be formed for each panel 12 through 20.

Figure 3:
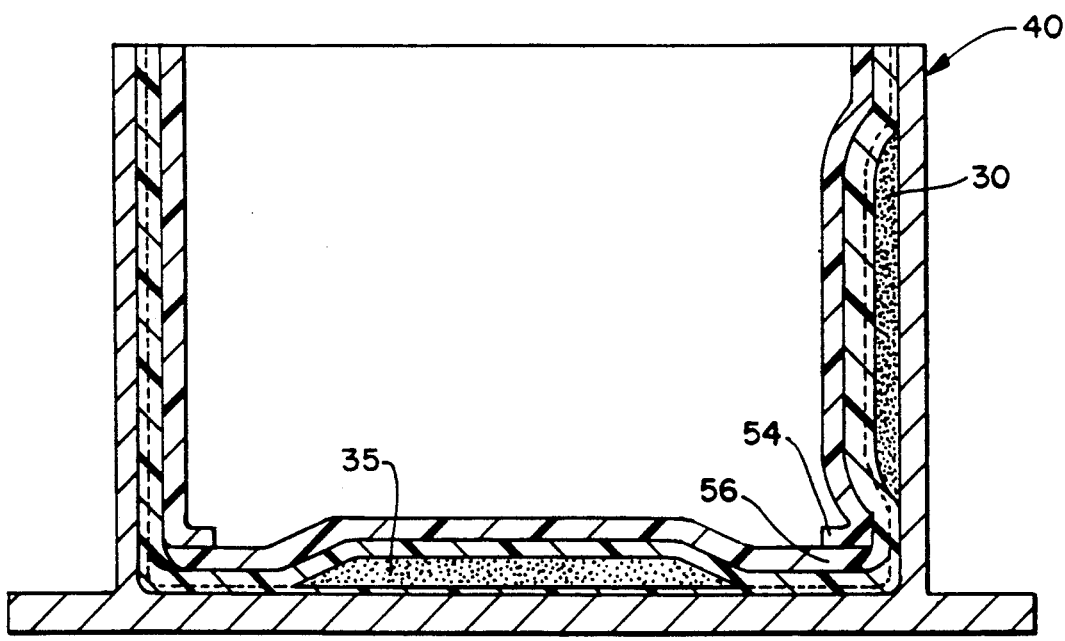
FIG. 3 is a sectional view taken through the female mold with the conformable cauls in position showing the overlapping relationship between adjacent conformable cauls.

With the individual cauls so laid up, and with the part model positioned within female mold 40, the entire unit is placed in a one-piece silicone bag and debulked and cured in an autoclave to produce individual conformable cauls for each of panels 12 through 20. In fabricating these conformable cauls, it is important that they be fabricated so that, as best shown in FIG. 3, there are overlapping flanges 54 and 56 between adjacent cauls so that the conformable cauls, when under pressure during curing, will assume the precise shape of the female mold. This is particularly important at the corners where the various panel members meet since high strength and, hence, less flexible reinforcement members are used in the composite material in these areas.

With this plurality of conformable cauls now fabricated, we are prepared to commence the molding process. Since these conformable cauls are reusable, they need be fabricated only the first time that a particular part, such as 10 of FIG. 1, is to be molded.

As stated earlier, part 10 is to be made of composite materials and by a molding process. While in our preferred embodiment, all lay-up of prepreg composite material will be made on the individual conformable cauls for each part 10 panel, it is possible and necessary if the prepreg material is to be continuous throughout the outer mold line of the part being fabricated 10 that a portion of it, the continuous portion at least, be laid up in the female mold as shown in FIG. 4.

Figure 4:
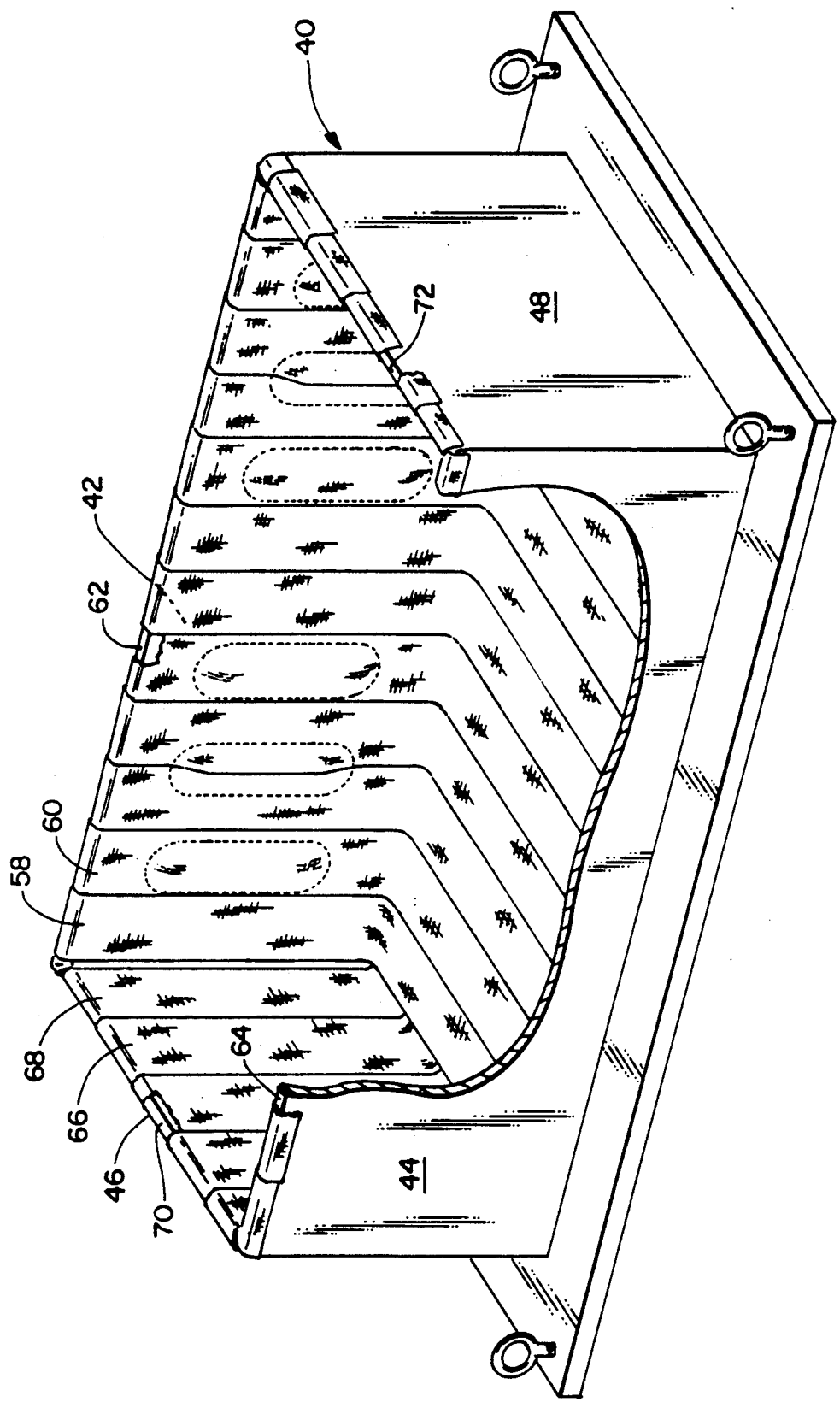
FIG. 4 is a showing of our female mold with prepreg plies of composite material shown laid up continuously throughout the dimension of the mold.

As shown in FIG. 4, a plurality of preimpregnated plies, such as 58, 60, 66 and 68, are laid up along the inner surface of female mold 40, while the remainder of the preimpregnated plies of the composite material will be laid up individually on the various conformable cauls for each part panel 12 through 20. As shown in FIG. 4, the various plies, such as 58 and 60, extend uninterrupted from the top surface 62 of wall 42 to the top surface 64 of wall panel 44. Similarly, plies such as 66 and 68 are continuous between the top surface 70 of wall 46 and the top surface 72 of wall 48, all for the purpose of added strength to the composite part 10 being fabricated.

Figure 5:
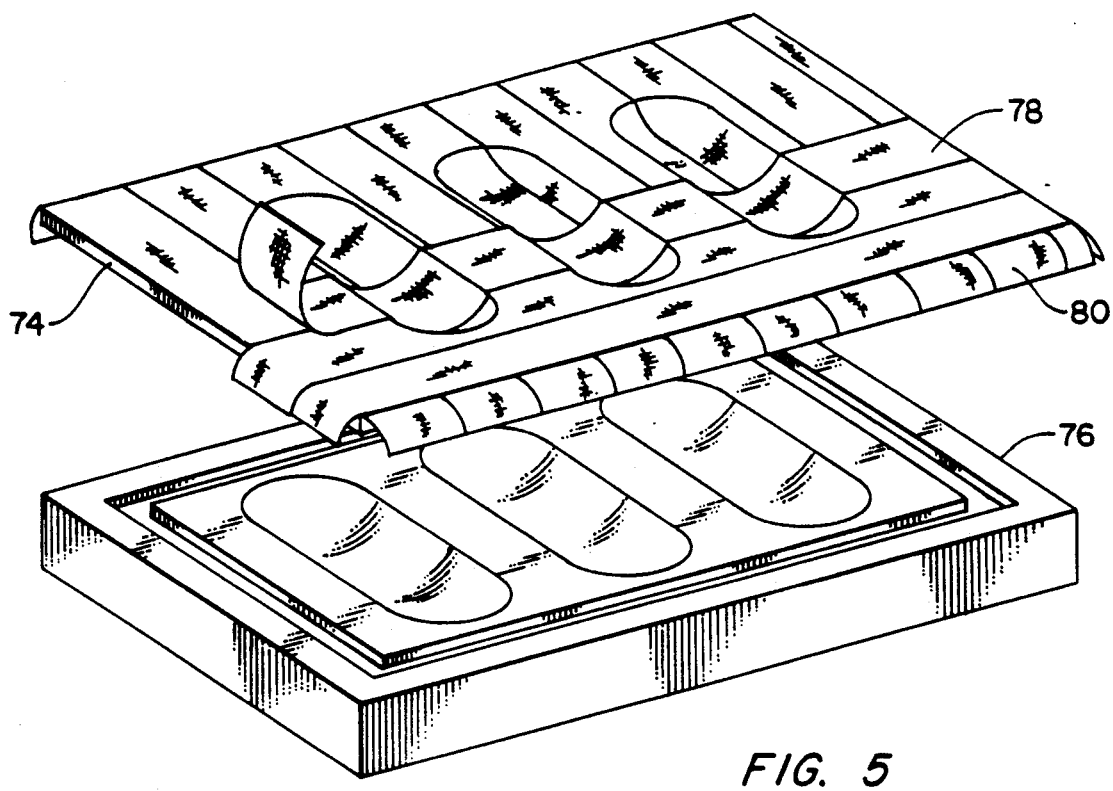
FIG. 5 is a showing of the manner in which the prepreg composite material layers are laid up on our conformable cauls.

For a description of the lay-up of the prepreg composite material plies on the conformable cauls, reference will be made to FIG. 5. In the FIG. 5 construction, a typical conformable caul 74 is positioned on rigid cradle 76, which is in the shape of caul 74, to provide it with complete rigidity. The various plies of prepreg composite material, such as 78 and 80, are laid up thereon along the contoured surface thereof and will be laid up as necessary to have the prepreg composite ply lay-up on conformable caul 74 form the outer mold line of part 10 by itself or in cooperation with the previously laid-up plies in the female mold shown in FIG. 4, while the opposite surface of the ply lay-up will define a portion of the inner mold line of part 10 in view of the shape of the conformable caul 74. Preferably, three layers of prepreg material, such as woven graphite fabrics, are laid up directly against conformable caul 70, and then some eleven layers of prepreg reinforced composite material, such as continuous graphite prepreg and woven graphite fabrics are layered thereon, and finally three final layers of prepreg material, such as woven graphite fabrics, are laid over the eleven reinforcing layers. All of these fabrics are made by Narmco of Anaheim, Calif. During the course of prepreg ply lay-up, if any strengthening members or details, such as the NOMEX ® cores 34, 35 and 36 shown in FIG. 1, or the reinforcing beads 30 shown therein, or the thermo plastic bonding substrate 37 shown therein, are required for the particular portion of the part 10 which will be fabricated utilizing the particular conformable caul 74 shown in FIG. 5, that part would be selectively positioned and included in the lay-up appropriately between the prepreg layers previously described.

While we have described this process as utilizing principally graphite fabrics, it should be borne in mind that the process lends itself to be used for various advance composite materials, such as KEVLAR ® figerglass, boron and other low temperature thermoplastics.

With the prepreg layers laid up on their conformable cauls 74, the laid-up unit, including rigid cradle 76, is placed on a conventional debulking table and subjected to vacuum so as to debulk the various prepreg ply layers so laid up to cause them to assume the shape of conformable caul 74 very exactly. Similar lay-ups are made on the conformable cauls for each of the panels 12 through 20 and debulked.

It will be noted that it is an important feature of our invention that with the conformable cauls so laid up, each can be placed in a cold environment to prevent curing of the prepreg plies until part 10 is to be fabricated, if necessary.

We are now ready to commence the molding of finished part 10. With all conformable cauls having the prepreg plies layered thereon selectively and debulked, we are now ready to place the conformable cauls with their laid-up material in female mold 40. The conformable cauls for floor panels 18 and 20 should first be positioned on the floor 50 of the female mold. The laid-up conformable cauls for side panels 22, 24, 26 and 28 will then be positioned against walls 42 and 44 of the female mold 40. Then the laid-up conformable cauls, which will form end panels 14 and 16, will be positioned against end walls 46 and 48 of the female mold, and finally the two laid-up conformable cauls, which will form the opposite sides of central panel or transverse bulkhead 12, will be positioned against the opposite sides of bulkhead 12 in the female mold. As shown in FIG. 2, a removable flange member 51 may be used to assist in positioning the conformable cauls which form bulkhead 12. Flange member 51 is selectively positioned by pin 53, which extends into mold boss 55, together with a corresponding pin and boss on the opposite side to extend between mold walls 42 and 44 at the proper location to properly position the more rigid of the two cauls which will form bulkhead 12. Positioning cones, such as 52, may be used to position the bottom of the more rigid caul which will form bulkhead 12.

With the laid-up and debulked conformable cauls so positioned in the female mold, a one-piece silicone vacuum bag 86 is then placed over the entire unit as depicted in FIG. 6 and a vacuum applied thereto so as to place the conformable cauls in a pressurized condition with respect to the female mold so that the prepreg layers of composite material, which are going to eventually form the composite part 10, are debulked under pressure in the mold. The mold in this vacuum bagged condition, with vacuum applied, is an autoclave ready unit which is then put into an autoclave 88 and cured. With the mold in the autoclave 88 and subjected to heat and additional pressure, the various lay-ups of prepreg material on the individual conformable cauls are co-cured to form a complex one-piece part made of composite material and having a plurality of panels oriented in diverse angular relationship, such as the one shown in FIG. 1. It will further be seen that in our molding process, the plurality of conformable cauls coact to form the male mold in our molding process.

A one-piece silicone bag is selected for use in our molding process because its one-piece construction conserves labor, and silicone is reversion resistant, i.e., it will assume its original shape following the molding process, the silicone bag is reusable and still further silicone is not attackable by the epoxy or other chemicals to which it may subjected during the curing process.

During the curing process, due to protection from the conformable cauls, we find that we obtain best results when the curing process takes place within silicone bag 86 at a pressure of at least 75 psi.

We claim:

1. The method of fabricating a complex part having inner and outer surfaces and made of composite material and having a plurality of panels oriented in diverse angular relationship and wherein the composite material which will form the panels is laid up, then co-cured in a molding process to form the complete part, including the steps of:
    a. providing a first mold shaped to define a plurality of part defining surfaces each associated with one of said part panels and which cooperate to define one of the entire inner surface and the entire outer surface of the part;
    b. providing a mold mateable with the first mold comprising a plurality of conformable cauls, one caul for each said panel of the part, and each said caul having a surface shaped to define a portion of the other of said inner and said outer surfaces of the part and shaped to cooperate with others of said conformable cauls to define the entire other of said inner and said outer surfaces of the part and to cooperate with one of said first mold surfaces to define at least a panel of the part;
    c. selectively laying up prepreg composite material on the surface of at least one of said molds to produce a composite material lay-up of selected dimension to form the complete part;
    d. placing each conformable caul surface in alignment with a corresponding first mold surface and with the composite material lay-up therebetween;
    e. placing the first mold with the conformable cauls and composite lay-ups so positioned in a vacuum bag to thereby provide an autoclave ready unit, and
    positioning the autoclave ready unit in an autoclave and subjecting it to heat and pressure so as to co-cure all composite material lay-ups to form the complete composite material part.

2. The method according to claim 1 wherein said composite material lay-up is in several discrete sections with each section laid up on and in the shape of one of said conformable cauls so that each section of composite material lay-up will form a portion of the complete part and coact with the other sections to form the complete part.

3. The method according to claim 2 wherein said laying up of the prepreg composite material is on each of the conformable cauls and including the step of debulking the prepreg lay-up while on its conformable caul.

4. The method according to claim 3 including the step of initially subjecting the vacuum bag to vacuum to debulk the composite material laid up on the conformable cauls before the autoclave ready unit is positioned in the autoclave.

5. The method according to claim 4 wherein said step of providing a first mold comprises providing a female mold and said step of providing a mating mold comprises providing a male mold.

6. The method according to claim 5 wherein said prepreg material is laid up in layers and including the step of accurately positioning at least one preformed detail on an appropriate layer of prepreg material during the lay-up procedure, then laying at least one additional layer of prepreg material over the detail so that the final lay-up includes both composite material and the detail laid up on the conformable caul for debulking and curing as a unit.

7. A method according to claim 5 wherein said conformable cauls are fabricated by the steps of:
    a. providing a model of the part;
    b. utilizing the model to form the plurality of conformable cauls, one for each panel of the part, and each having a contoured surface shaped to define a portion of the other of said inner and said outer surfaces of the part and to cooperate with the other conformable cauls to define the entire other of said inner and said outer surfaces of the part.

8. The method according to claim 5, wherein said conformable cauls are fabricated by the steps of:
    a. providing a model of the part to be fabricated,
    b. laying up layers of selected fluoroelastomer on each panel of the model, and
    c. debulking and curing the laid-up layers of selected fluoroelastomer so that one surface thereof is in the precise contour of the panel of the finished part model upon which it is laid up to thereby provide a plurality of conformable cauls, one for each panel of the part, and each having a surface shaped to define a portion of one of said inner or outer surfaces of the part, and to cooperate with others of said conformable cauls to define the entire one of said inner and said outer surfaces of the part.

9. The method according to claim 8 and including the steps of:
 a. covering interior surfaces of the part model with separator release film before commencing the prepreg lay-up, and
 b. positioning layers of separator release film between the prepreg lay-up on each panel and the prepreg lay-up on adjacent panels so that discrete conformable cauls will be formed.

10. The method according to claim 9 including mating the conformable cauls of fluoroelastomer material and wherein the layers consist of a first layer of Teflon ® Polytetrafluroethylene film coated gum stock positioned against the model, a second layer of fluoroelastomer gum stock, a third and fourth layers of KEVLAR ® Polyamide fiber reinforced fluoroelastomer with 45° angle fibers, and a fifth layer of fluoroelastomer gum stock.

11. The method according to claim 10 wherein said first layer is 0.032 inches, the second layer is 0.030 inches, the third and fourth layer is 0.040 inches, and the fifth layer is 0.034 inches so as to produce discrete conformable cauls of reinforced fluoroelastomer of a thickness of 0.172 inches.

12. The method according to claim 11 wherein said composite material lay-up consists of three layers of prepreg composite material positioned against the conformable caul shaped surface, eleven layers of reinforced prepreg material positioned thereon, and three layers of prepreg material laid up upon the reinforced layers, and wherein said prepreg layers are made of high performance composite prepreg materials.

13. The method according to claim 12 wherein at least one of the layers of prepreg composite material is continuous over mold surfaces which form surfaces of the molded part.

14. The method according to claim 13 wherein said conformable cauls are fabricated to have peripheral layers which slightly overlap the first mold surface with which it is associated so as to conform to corners between first mold surfaces when the conformable cauls are subjected to heat and pressure during the co-curing process.

15. The method according to claim 14 wherein the pressure within the autoclave during curing is at least 75 psi.

16. The method according to claim 11 or 15 and wherein said first mold has locator cones projecting therefrom to loosely position the conformable cauls with respect to the first mold during the debulking and curing steps.

17. The method of fabricating a complex part according to claim 1 wherein the vacuum bag is a one-piece silicone bag.

* * * * *